(12) United States Patent
Oh et al.

(10) Patent No.: US 11,732,899 B2
(45) Date of Patent: Aug. 22, 2023

(54) ELECTRIC RANGE AND CONTROLLING METHOD OF THE ELECTRIC RANGE

(71) Applicant: Samsung Electronics Co., Ltd., Suwon-si (KR)

(72) Inventors: Sungmin Oh, Suwon-si (KR); Changhyun Son, Suwon-si (KR); Jaehee Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 16/587,856

(22) Filed: Sep. 30, 2019

(65) Prior Publication Data

US 2020/0132309 A1    Apr. 30, 2020

(30) Foreign Application Priority Data

Oct. 31, 2018 (KR) .................. 10-2018-0131666

(51) Int. Cl.
*F24C 7/08* (2006.01)
*F23N 5/24* (2006.01)
(Continued)

(52) U.S. Cl.
CPC .............. *F24C 7/082* (2013.01); *F23N 5/242* (2013.01); *F24C 7/046* (2013.01); *F24C 7/087* (2013.01);
(Continued)

(58) Field of Classification Search
CPC ........ H05B 1/0258–0263; H05B 3/746; A21B 1/00–22; F24C 70/04–046;
(Continued)

(56) References Cited

U.S. PATENT DOCUMENTS 5,854,520 A    12/1998  Buck et al.
6,951,997 B2 *  10/2005  Larson .................. F24C 15/106
                                                219/483
(Continued)

FOREIGN PATENT DOCUMENTS

CN    1677000 A    10/2005
DE    199 37 630 A1    2/2001
(Continued)

OTHER PUBLICATIONS

International Search Report dated Jan. 21, 2020, issued in International Patent Application No. PCT/KR2019/013028.
(Continued)

*Primary Examiner* — Hung D Nguyen

(74) *Attorney, Agent, or Firm* — Jefferson IP Law, LLP

(57) ABSTRACT

A cooking apparatus is provided. The cooking apparatus includes a first manipulation part, a second manipulation part, an electric heating element for heating an object to be cooked, a switch connected with a relay that is turned on/turned off, and which is for providing power provided through the relay in a turned-on state to the electric heating element according to a user manipulation input through the first manipulation part, and a processor which, based on receiving input of a user manipulation of the second manipulation part, turns on the relay for a predetermined time period.

10 Claims, 13 Drawing Sheets

(51) Int. Cl.
    *H05B 1/02* (2006.01)
    *G05D 23/19* (2006.01)
    *F24C 7/04* (2021.01)

(52) U.S. Cl.
    CPC ....... *G05D 23/1917* (2013.01); *H05B 1/0263* (2013.01)

(58) Field of Classification Search
    CPC ........ F24C 7/087–088; F24C 3/12–128; F24C 5/16; F24C 7/04–046; F24C 7/08–085; F23N 5/242; G05D 23/1917
    See application file for complete search history.

(56) References Cited

U.S. PATENT DOCUMENTS

| | | | |
|---|---|---|---|
| 7,045,748 B2 | 5/2006 | Blackson et al. | |
| 7,401,610 B1 | 7/2008 | Cherry | |
| 7,422,010 B2 | 9/2008 | Gama et al. | |
| 7,479,006 B2 | 1/2009 | Newsom | |
| 8,783,243 B2 | 7/2014 | Hodapp, Jr. et al. | |
| 2004/0004068 A1 | 1/2004 | Atkinson | |
| 2005/0236391 A1 | 10/2005 | Gama et al. | |
| 2009/0192657 A1 | 7/2009 | Heicks | |
| 2010/0181303 A1 | 7/2010 | Sakakibara et al. | |
| 2011/0132900 A1* | 6/2011 | Kinoshita | F24C 7/04 219/443.1 |
| 2015/0351163 A1* | 12/2015 | Kim | H05B 6/1218 219/621 |
| 2015/0374163 A1 | 12/2015 | Spanò et al. | |
| 2016/0018112 A1* | 1/2016 | Phillips | H05B 1/0263 219/506 |
| 2016/0076777 A1* | 3/2016 | Wait | F24C 14/00 126/197 |
| 2016/0270154 A1 | 9/2016 | Cha | |
| 2017/0023256 A1 | 1/2017 | Bach et al. | |
| 2017/0031337 A1 | 2/2017 | Jablokov et al. | |
| 2017/0118798 A1* | 4/2017 | Johnson | H05B 1/0263 |
| 2017/0299195 A1* | 10/2017 | Bach | H05B 1/0202 |
| 2018/0003392 A1 | 1/2018 | Babu et al. | |

FOREIGN PATENT DOCUMENTS

| | | |
|---|---|---|
| JP | 2000-082352 A | 3/2000 |
| JP | 2006-269147 A | 10/2006 |
| KR | 10-2017-0029915 A | 3/2017 |
| KR | 10-2018-0023391 A | 3/2018 |

OTHER PUBLICATIONS

Extended European Search Report dated Sep. 21, 2021, issued in European Patent Application No. 19880360.3.
Korean Office Action with English translation dated Nov. 25, 2022; Korean Application No. 10-2018-0131666.
Chinese Office Action with English translation dated Mar. 17, 2023; Chinese Application No. 201980072618.X.

* cited by examiner

100

ELECTRIC RANGE AND CONTROLLING METHOD OF THE ELECTRIC RANGE

CROSS-REFERENCE TO RELATED APPLICATION(S)

This application is based on and claims priority under 35 U.S.C. § 119(a) of a Korean patent application number 10-2018-0131666, filed on Oct. 31, 2018, in the Korean Intellectual Property Office, the disclosure of which is incorporated by reference herein in its entirety.

BACKGROUND

1. Field

The disclosure relates to a cooking apparatus and a controlling method of the cooking apparatus. More particularly, the disclosure relates to a cooking apparatus that is capable of controlling a heating element safely and a controlling method of the cooking apparatus.

2. Description of Related Art

Recently, as electronic technologies have developed, various electronic apparatuses that suit consumers' needs are being developed. In particular, recently, electric cook tops that can cook objects to be cooked (e.g., various types of food) with electricity are being developed.

An electric cook top is a cooking apparatus that heats an object to be cooked contained in a cooking container by heating at least one burner through an electric heating element. Such an electric cook top can not only be implemented and used as a single entity, but can also be used while being implemented in the form of an electric range further including an oven under the electric cook top.

An electric cook top of the related art includes a mechanical switch (i.e., an energy regulator, or an infinite switch) and an electric heating element between a Live 1 terminal and a Live 2 terminal which are alternate current power supplies, and its operation is controlled as the turning-on/turning-off of the mechanical switch is controlled through a two-step manipulation (i.e., push and turn) at a manipulation part.

In this case, as the electric heating element operates while being subordinate to the manipulation of the mechanical switch, there is a problem that a user's intention of manipulation cannot be determined. For example, the manipulation part may be manipulated unintentionally by a pet or a child or due to a user's carelessness, and the electric heating element of the cook top operates accordingly, and a fire may therefore break out.

For preventing such a problem of the technology of the related art, there is a technology of including a relay circuit in a circuit of an electric cook top, and turning off the relay when a child lock function is operated, and thereby restricting the operation of an electric heating element. However, in the case of such a technology, the operation of an electric heating element is restricted only when a user activates a child lock function, and thus there is a problem that occurs in a standby state where a child lock function is not activated, the function cannot be performed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or advantages and to provide at least the advantages described below. Accordingly, an aspect of the disclosure is to provide a cooking apparatus that can protect a user from an unintentional manipulation, and a controlling method of the cooking apparatus.

Another aspect of the disclosure is to provide a cooking apparatus that can prevent occurrence of a problem according to an unintentional manipulation even in a standby state where a child lock function is not activated, and a controlling method of the cooking apparatus.

Additional aspects will be set forth in part in the description which follows and, in part, will be apparent from the description, or may be learned by practice of the presented embodiments.

In accordance with an aspect of the disclosure, a cooking apparatus is provided. The cooking apparatus includes a first manipulation part, a second manipulation part, an electric heating element for heating an object to be cooked, a switch connected with a relay that is turned on/turned off, and which is for providing power provided through the relay in a turned-on state to the electric heating element according to a user manipulation for the first manipulation part, and a processor which, based on receiving an input of a user manipulation for the second manipulation part, turns on the relay for a predetermined time period.

Also, the first manipulation part may include a knob which is for controlling turning-on/turning-off of the switch by rotating according to the user manipulation, and the switch may, based on being turned on according to the user manipulation for the knob, provide the power provided through the relay in a turned-on state to the electric heating element.

In addition, the processor may, based on receiving an input of a user manipulation for the second manipulation part, determine the manipulation state of the knob, and based on determining that the knob is in a turned-off state, may turn on the relay in a turned-off state for a predetermined time period, and turn off the relay again after the predetermined time period passes.

Also, the cooking apparatus may further include a speaker, and the processor may, based on receiving an input of a user manipulation for the knob while a user manipulation for the second manipulation part is not input, control the speaker to output a warning sound or a voice message guiding a manipulation for the second manipulation part.

Further, the processor may, based on receiving an input of a user manipulation for the second manipulation part, determine the operation state of the knob, and based on determining that the knob is in a rotated state, may maintain the turned-off state of the relay.

In addition, the processor may, based on a user manipulation for the second manipulation part being input while the knob is in a rotated state, and the knob in a rotated state getting in a turned-off state according to a user manipulation within the predetermined time period, turn on the relay in a turned-off state.

Also, the processor may, based on receiving an input of a user manipulation for the second manipulation part, determine the manipulation state of the knob, and based on determining that the knob is in a rotated state, may turn on the relay in a turned-off state.

Further, the processor may, based on receiving an input of a user manipulation for the second manipulation part while the electric heating element operates, maintain the operation of the electric heating element regardless of the input user manipulation.

In addition, the cooking apparatus may further include a third manipulation part receiving an input of a user manipulation for a child lock function, and the processor may, based on receiving the input of the user manipulation for activating the child lock function through the third manipulation part, activate the child lock function, and based on receiving the input of the user manipulation selecting the second manipulation part while the child lock function is activated, may turn on the relay during the predetermined time period.

Also, the processor may, based on the child lock function being activated, maintain a door for opening and closing a cooking space of the cooking apparatus in a locked state.

In accordance with another aspect of the disclosure, a controlling method of a cooking apparatus is provided. The controlling method includes an electric heating element for heating an object to be cooked according to an embodiment of the disclosure includes the steps of, based on receiving input of a user manipulation for a second manipulation part, turning on a relay of the cooking apparatus for a predetermined time period, and providing power provided through the relay in a turned-on state to the electric heating element according to a user manipulation for a first manipulation part.

Also, the first manipulation part may include a knob which is for controlling turning-on/turning-off of a switch of the cooking apparatus by rotating according to the user manipulation. In the providing step, through the switch which is turned on according to a user manipulation for the knob, the power may be provided to the electric heating element.

In addition, the turning-on step may include the steps of, based on receiving an input of a user manipulation for the second manipulation part, determining the manipulation state of the knob, and based on determining that the knob is in a turned-off state, turning on the relay in a turned-off state for a predetermined time period. Also, the controlling method may further include the step of turning off the relay again after the predetermined time period passes.

Further, the controlling method may further include the step of, based on receiving an input of a user manipulation for the knob while a user manipulation for the second manipulation part is not input, outputting a warning sound or a voice message guiding a manipulation for the second manipulation part.

Also, the controlling method may further include the step of, based on receiving an input of a user manipulation for the second manipulation part, determining the manipulation state of the knob, and based on determining that the knob is in a rotated state, maintaining the turned-off state of the relay.

In addition, the controlling method may further include the step of, based on a user manipulation for the second manipulation part being input while the knob is in a rotated state, and the knob in a rotated state getting in a turned-off state according to a user manipulation within the predetermined time period, turning on the relay in a turned-off state.

Further, the controlling method may further include the step of, based on receiving an input of a user manipulation for the second manipulation part, determining the manipulation state of the knob, and based on determining that the knob is in a rotated state, turning on the relay in a turned-off state.

Also, the controlling method may further include the step of, based on receiving an input of a user manipulation for the second manipulation part while the electric heating element operates, maintaining the operation of the electric heating element regardless of the input user manipulation.

In addition, the cooking apparatus may further include a third manipulation part receiving an input of a user manipulation for a child lock function. The controlling method may further include the steps of, based on receiving an input of a user manipulation for activating the child lock function through the third manipulation part, activating the child lock function, and based on receiving an input of a user manipulation selecting the second manipulation part while the child lock function is activated, turning on the relay during the predetermined time period.

Also, the controlling method may further include the step of, based on the child lock function being activated, maintaining a door for opening and closing a cooking space of the cooking apparatus in a locked state.

According to the various embodiments of the disclosure as described above, a user can be protected safely from an unintentional manipulation for a cooking apparatus. Also, a problem according to an unintentional manipulation can be prevented even in a standby state where a child lock function is not activated.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
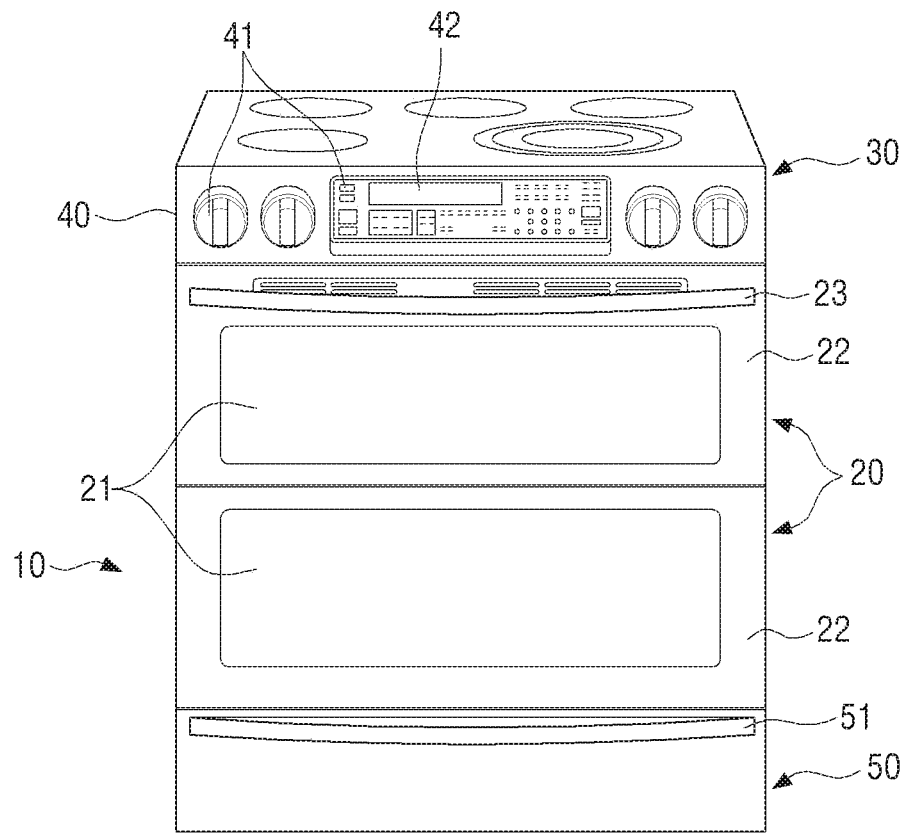
FIG. 1 is a diagram of a cooking apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The suffix "part" for components used in the following description is provided or interchangeably used in consideration of only easiness in drafting the specification, and does not have meaning or a role of itself distinguishing it from other components.

Also, terms used in the disclosure are used for explaining the various embodiments of the disclosure, and are not intended to restrict and/or limit the disclosure. In addition, singular expressions include plural expressions, unless defined obviously differently in the context.

Further, in the disclosure, the terms such as 'include' and 'have/has' should be construed as designating that there are such characteristics, numbers, steps, operations, elements, components or a combination thereof described in the specification, but not to exclude the existence or possibility of adding one or more of other characteristics, numbers, steps, operations, elements, components or a combination thereof.

Also, the expressions "first," "second" and the like used in the disclosure may be used to describe various elements regardless of any order and/or degree of importance. Also, such expressions are used only to distinguish one element from another element, and are not intended to limit the elements.

In addition, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the other element.

Also, terms used in the various embodiments of the disclosure may be interpreted as meanings generally known to those of ordinary skill in the art described in the disclosure, unless defined differently in the disclosure.

Hereinafter, various embodiments of the disclosure will be described in detail with reference to the accompanying drawings.

FIG. 1 is a diagram of a cooking apparatus according to an embodiment of the disclosure.

Referring to FIG. 1, a cooking apparatus 100 according to an embodiment of the disclosure may be implemented as an electric range including an oven 20 and a cook top 30.

Specifically, the cooking apparatus 100 includes a main body 10 forming the exterior of the cooking apparatus 100. Also, inside the main body 10, an oven 20 may be provided, and in the top portion of the main body 10, a cook top 30 may be provided, and on the front surface of the main body 10, a control panel 40 may be provided.

In the oven 20, a cooking space 21 where an object to be cooked (e.g., food, a cooking container, or a cooking container containing food) is located, may be provided. In the oven 20, a heating device that generates heat inside the cooking space 21 may be arranged. For example, the heating device may include an electric heating element that generates heat by electric current. Accordingly, food located in the cooking space 21 may be cooked by heat generated by the electric heating element.

Also, on the front surface of the oven 20, a door 22 is provided. For example, the door 22 may rotate with a hinge at the center, and thereby open and close the cooking space 21. On the door 22, a handle 23 may be provided. The handle 23 may be provided in the form of protruding to the front side, or in the form where a groove is formed. Accordingly, a user may grab the handle 23 and open or close the door 22, and locate an object to be cooked in the cooking space 21.

In the lower part of the oven 20, a drawer 50 where food or tableware can be stored may be provided. The drawer 50 may be provided such that it can be drawn to the front side of the main body 10. In this case, on the front surface of the drawer 50, a handle 51 may be provided. The handle 51 may be provided in the form of protruding to the front side, or in the form where a groove is formed. Accordingly, a user may pull the handle 51 and thereby draw the drawer 50 from the main body 10, and grab and push the handle 51 and thereby insert the drawer 50 into the main body 10.

According to an embodiment of the disclosure, in the oven 20, the door 22 for opening and closing the cooking space 21 may be placed in a locked state according to a user's setting of the child lock function.

The cook top 30 may be provided in the upper part of the main body 10, and may include a heating device that can heat an object to be cooked. The heating device may include an electric heating element that generates heat by electric current. Accordingly, a user may heat an object to be cooked located on the heating device of the cook top 30. A plurality of heating devices may be provided, and the heating devices may heat a plurality of objects to be cooked simultaneously.

The control panel 40 may be provided on the front surface of the main body 10 or the cook top 30, and may include a manipulation part 41 and a display 42.

The manipulation part 41 is a component for receiving input of various user manipulations for controlling the cooking apparatus 100, and may be provided in the form of a button, a touch panel, or a knob. Accordingly, through the manipulation part 41, a user may input a user manipulation of turning on/turning off the oven 20 or the cook top 30, a user manipulation for setting the temperature and the operation time of the oven 20 or the cook top 30, a user manipulation for setting a child lock function of the oven 20, a user manipulation for turning on the relay of the cook top 30, etc.

The display 42 is a component for displaying the operation state of the cooking apparatus 100, and may display various types of information such as the cooking time, the cooking temperature, a warning, a notification, a manipulation guide, etc.

According to an embodiment of the disclosure, when a user manipulation for turning on the relay is input through the manipulation part 41, the cooking apparatus 100 may turn on the relay for a predetermined time period, and when a user manipulation for turning on the cook top 30 while the relay is turned on is input through the manipulation part 41, the cooking apparatus 100 may provide power to the electric heating element and operate the electric heating element. A user manipulation for turning on the relay may be input through a separate key provided on the manipulation part 41. Accordingly, a user can be protected safely from an unintentional manipulation to the cooking apparatus. Also, even in a standby state where a child lock function is not activated, a problem according to an unintentional manipulation can be prevented.

In the case of a conventional cooking apparatus, when a child lock function was activated, the door of the oven rage was locked and the manipulation part was also deactivated. Accordingly, in a state where the child lock function was activated, it was impossible to use the cook top. However, according to an embodiment of the disclosure, even in a state where the child lock function is turned on and the door 22 of the oven 20 is locked, the cook top 30 can be used separately.

So far, an example where the cooking apparatus 100 is implemented while including the cook top 30 and the oven 20 was explained. However, the disclosure is not limited thereto, and the cooking apparatus 100 may be implemented only as the cook top 30.

Figure 2:
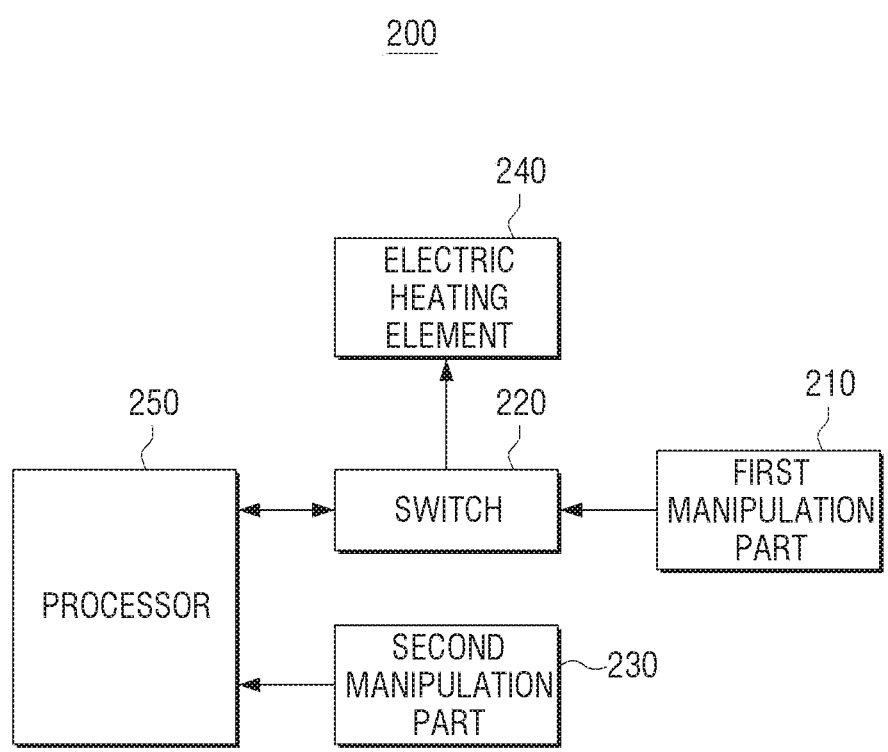
FIG. 2 is a block diagram of a cooking apparatus according to an embodiment of the disclosure.

FIG. 2 is a block diagram of a cooking apparatus according to an embodiment of the disclosure.

Referring to FIG. 2, a cooking apparatus 200 includes a first manipulation part 210, a switch 220, a second manipulation part 230, an electric heating element 240, and a processor 250.

The first manipulation part 210 may receive input of a user manipulation for turning on/turning off the switch 220. The first manipulation part 210 may be a mechanical manipulation part. For example, the first manipulation part 210 may be in the form of a knob rotating left and right. In this case, according to a user manipulation of rotating the knob left and right, the turning-on/turning-off of the switch 220 may be controlled. In case the electric heating element 240 operates, as the knob rotates more based on the location of the knob where the switch 220 is turned off, the temperature at which the electric heating element 240 is heated may increase.

According to an embodiment of the disclosure, the first manipulation part 210 and the switch 220 may be implemented integrally, and may be implemented in the form of a knob on the control panel 40, but the disclosure is not limited thereto.

The second manipulation part 230 may receive input of a user manipulation for turning on the relay. For example, the second manipulation part 230 may be implemented in the form of a button or a touch panel on the control panel 40, but the disclosure is not limited thereto.

The electric heating element 240 is a component for converting electricity into heat and heating an object to be cooked. The electric heating element 240 may be heated when an alternate current power supply is input. An alternate current power supply may be, for example, a single-phase 4 wire alternate current power supply, and the electric heating element 240 can be heated when it is connected to both of a Live 1 terminal and a Live 2 terminal of an alternate current power supply.

The switch 220 is turned on/turned off according to a user manipulation for the first manipulation part 210, and when the switch 220 is turned on while the relay is turned on, the switch 220 provides power to the electric heating element 240. Specifically, the switch 220 is connected with the relay that is turned on/turned off by the processor 250, and may provide power provided through the relay in a turned-on state to the electric heating element 240 according to a user manipulation input through the first manipulation part 210.

For example, when the switch 220 is turned on, the Live 1 terminal may be connected with the electric heating element 240 through the switch 220. However, when the relay is in a turned-off state, even if the switch 220 is turned on, the Live 2 terminal is not connected with the electric heating element 240, and the electric heating element 240 is not heated.

Accordingly, in case the relay is turned on according to a user manipulation for the second manipulation part 230, and the switch 220 is turned on according to a user manipulation for the first manipulation part 210, the electric heating element 240 may receive input of power from the Live 1 terminal and the Live 2 terminal of the alternate current power supply and be heated.

The processor 250 controls the overall operations of the cooking apparatus 200. In particular, when a user manipulation for the second manipulation part 230 is input, the processor 250 may turn on the relay for a predetermined time period. The predetermined time period may be set as an appropriate time period by the developer or the manufacturer of the cooking apparatus 100 such as 10 seconds or 20 seconds.

For example, when a user manipulation for the second manipulation part 230 is input, the processor 250 may turn on the relay and count the time. Accordingly, according to an embodiment of the disclosure, the processor 250 may turn off the relay when the counted time reaches a predetermined time period.

Also, the processor 250 may determine the manipulation state of the first manipulation part 210. Specifically, the switch 220 and the processor 250 may be connected with each other through electrical wiring. Accordingly, the processor 250 may detect a signal provided from the switch 220 and determine the manipulation state of the first manipulation part 210. For example, the processor 250 may determine the location of the knob based on the signal provided from the switch 220.

Accordingly, the processor 250 may perform various operations according to the manipulation state of the first manipulation part 210 and whether the predetermined time period passed, as will be described in detail with reference to FIGS. 4 to 6 below.

In the various embodiments of the disclosure, the relay does not toggle between turning-on/turning-off every time a user manipulation for the second manipulation part 230 is input.

For example, if a user performs a manipulation for the second manipulation part 230 in a standby state (a state where the electric heating element 240 does not operate), the processor 250 determines the manipulation state of the first manipulation part 210. Accordingly, if it is determined that the first manipulation part 210 is in a turned-off state, the processor 250 turns on the relay during a predetermined time period. In case there is a user manipulation for the second manipulation part 230 while the relay is turned on, the processor 250 does not turn off the relay, but ignores the user manipulation for the second manipulation part 230.

For this, the processor 250 may be implemented as one or more of a central processing unit (CPU), a micro-controller, an application processor (AP) or a communication processor (CP), an Advanced RISC Machine (ARM) processor, and a micom.

According to an embodiment of the disclosure, the cooking apparatus 200 may further include a display (not shown) or a speaker (not shown). Accordingly, the processor 250 may output various warning messages or guide messages through the display (not shown) and the speaker (not shown).

For example, in a state where a user manipulation for the second manipulation part 230 is not input, if a user manipulation for the first manipulation part 210 is input, the processor 250 may control the speaker (not shown) to output a notification or warning sound. Depending on various embodiments, the display (not shown) may be controlled to output a guide message guiding to manipulate the first manipulation part 210 after manipulating the second manipulation part 230 first.

According to an embodiment of the disclosure, the display (not shown) or the speaker (not shown) may be implemented on the control panel 40, but the disclosure is not limited thereto.

According to an embodiment of the disclosure, the cooking apparatus 200 may further include an oven 20. The cooking apparatus 200 may include a third manipulation part (not shown) for activating a child lock function, and when a use manipulation for the third manipulation part (not shown) is input, the processor 250 may activate the child lock function. Specifically, if a user manipulation for the third manipulation part (not shown) is input, the processor 250 may maintain the door 22 for opening and closing the cooking space 21 of the oven 20 included in the cooking apparatus 200 in a locked state.

According to an embodiment of the disclosure, even in a state where the child lock function is activated, if a user manipulation for the second manipulation part 230 is input, the processor 250 may turn on the relay for a predetermined time period. Accordingly, if the first manipulation part 210 is turned on while the relay is turned on, the electric heating element 240 may be heated. That is, according to an embodiment of the disclosure, the function of the electric cook top can be controlled independently from the child lock function.

Hereinafter, the configuration of the cooking apparatus 200 according to an embodiment of the disclosure will be described in more detail with reference to FIG. 3.

Figure 3:
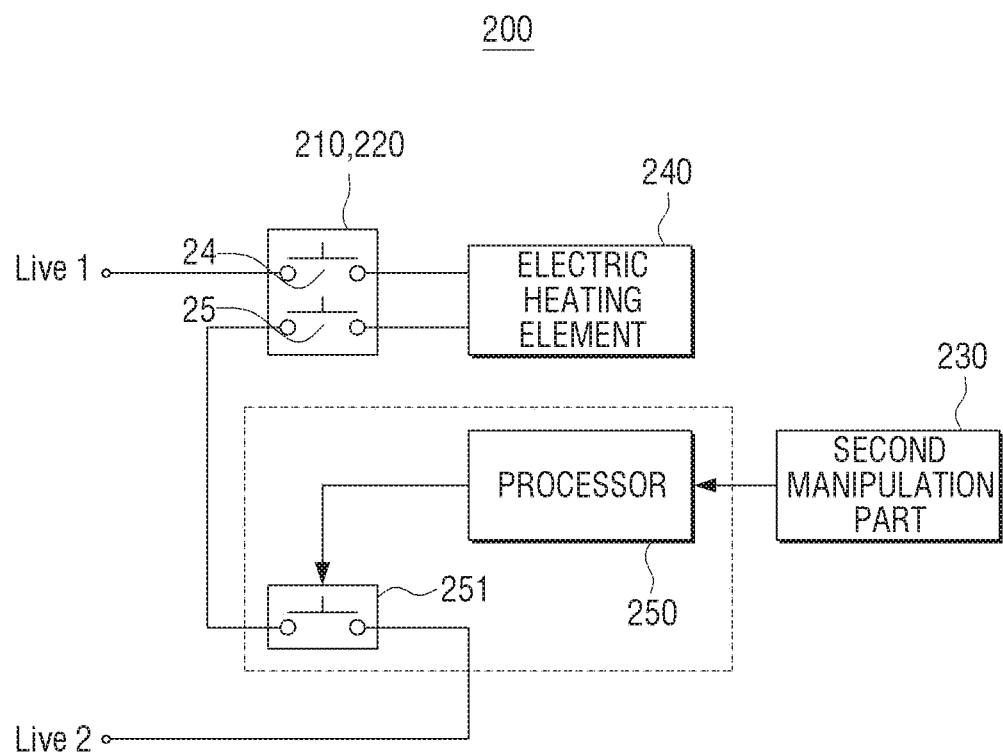
FIG. 3 is a detailed block diagram of a cooking apparatus according to an embodiment of the disclosure.

FIG. 3 is a detailed block diagram of a cooking apparatus according to an embodiment of the disclosure. In explaining FIG. 3, explanation overlapping with the aforementioned explanation with reference to FIG. 2 will be omitted.

Referring to FIG. 3, an example where the power supply is a single-phase 4 wire alternate current power supply is described. However, the power supply is not limited thereto. Also, in FIG. 3, the power line Live 2 is connected with the relay 251, but depending on various embodiments, the Live 1 line can obviously be connected with the relay 251. In addition, in FIG. 3, an example where the first manipulation part 210 and the switch 220 are implemented as a knob switch in an integrated type is described, but the disclosure is not limited thereto.

As illustrated in FIG. 3, the knob (i.e., the first manipulation part 210) and switch 220 includes two switches internally, and according to rotation of the knob (i.e., the first manipulation part 210), the two switches 24, 25 operate together. That is, the switches are turned on/turned off simultaneously. One switch 24 of the knob (i.e., the first manipulation part 210) and switch 220 is connected between the Live 1 power (e.g., +120V) line and the electric heating element 240, and the other switch 22 is connected between the electric heating element 240 and the relay 251.

One end of the relay 251 is connected with the other switch 22, and the other end is connected to the Live 2 power (e.g., −120V) line. The relay 251 is a type of switch apparatus that is turned on/turned off by the processor 250 according to a user's manipulation of the second manipulation part 230, and depending on various embodiments, it may be a direct current (DC) relay or an alternating current (AC) relay.

Referring to the relation of connection between elements as above, it can be figured out that the Live 2 power supply may be supplied to the electric heating element 240 only when the relay 251 is turned on, and in case the relay 251 is turned off, the Live 2 power supply is not supplied to the electric heating element 240 even if the knob (i.e., the first manipulation part 210) and switch 220 is turned on.

As described above, the electric heating element 240 operates only when both of the Live 1 and Live 2 power supplies are connected. Thus, even if the knob (i.e., the first manipulation part 210) and switch 220 is turned on, if the relay 251 is not in a turned-on state according to a manipulation of the second manipulation part 230, the electric heating element 240 does not operate.

In the example in FIG. 3, the processor 250 and the relay 251 may be arranged together on a printed board assembly (PBA). However, the disclosure is not limited thereto, and depending on various embodiments, a separate relay circuit can obviously be provided outside a PBA where the processor 250 exists.

Hereinafter, various embodiments of the disclosure will be explained with reference to FIGS. 4 to 6. In explaining FIGS. 4 to 6, explanation on components overlapping with the aforementioned components will be omitted.

Figure 4:
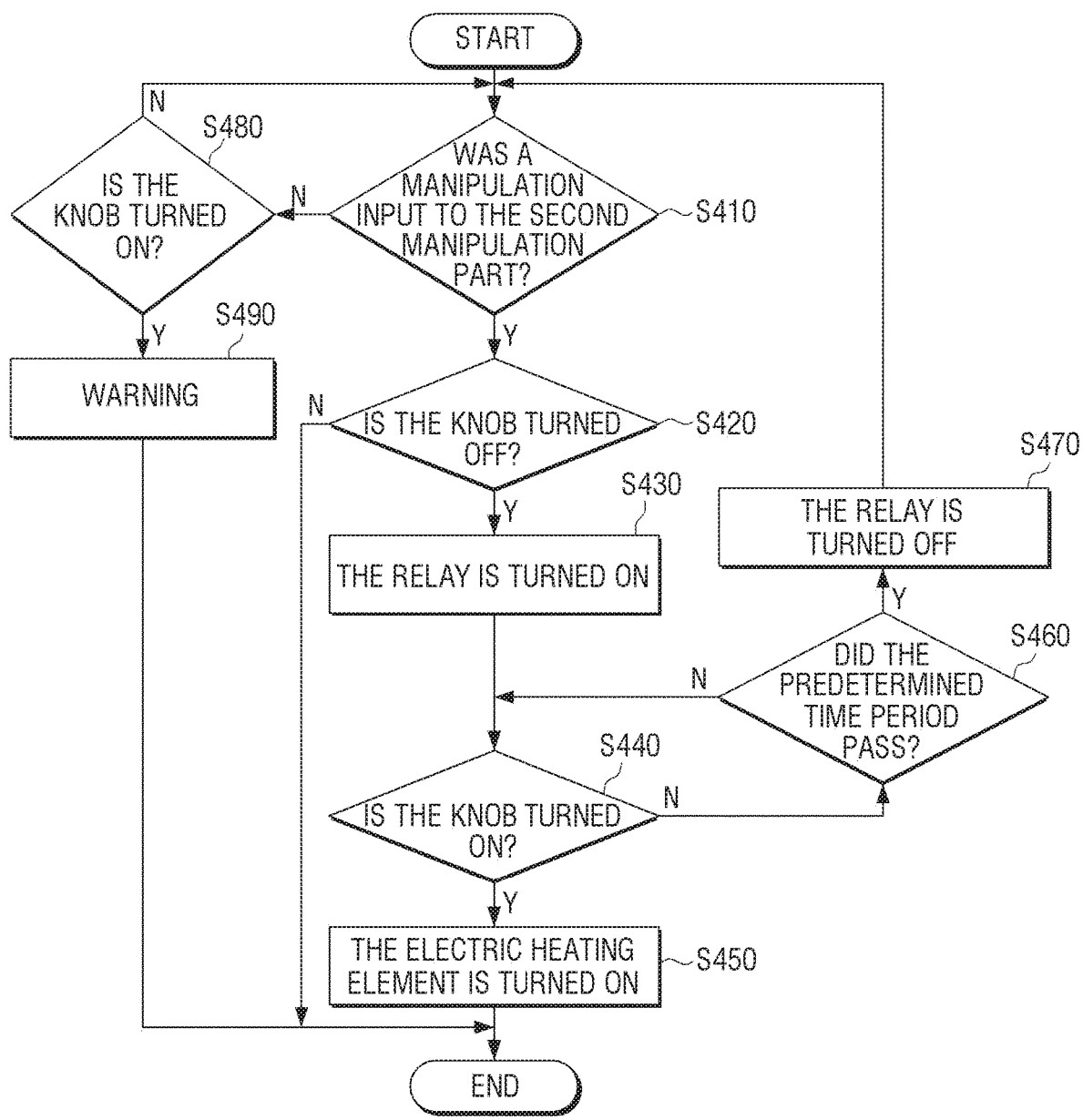
FIG. 4 is a flow chart illustrating an operation of a cooking apparatus according to an embodiment of the disclosure.

FIG. 4 is a flow chart illustrating an operation of a cooking apparatus according to an embodiment of the disclosure.

Referring to FIG. 4, when a user manipulation for the second manipulation part 230 is input at operation S410, Y, the processor 250 may determine the manipulation state of the knob (i.e., first manipulation part 210).

Accordingly, if it is determined that the knob (i.e., first manipulation part 210) is in a turned-off state at operation S420, Y, the processor 250 may turn on the relay 251 for a predetermined time period at operation S430. That is, if a user manipulation for the second manipulation part 230 is input in a standby state (in case the knob (i.e., first manipulation part 210) and the relay are in a turned-off state), the relay is turned on for a predetermined time period.

Afterwards, if the knob (i.e., first manipulation part 210) is turned on by the user within a predetermined time period while the relay 251 is turned on at operation S440, Y, the electric heating element 240 is turned on at operation S450. In case a user manipulation for the second manipulation part 230 is input in a state where the electric heating element 240 is turned on, i.e., in a state where the electric heating element 240 is operating, the processor 250 may not turn off the relay 251, but ignore the user manipulation for the second manipulation part 230.

If the knob (i.e., first manipulation part 210) is not turned on while the relay is turned on at operation S440, and a predetermined time period passes at operation S460, Y, the processor 250 turns off the relay at operation S470.

If a user manipulation for the second manipulation part 230 is input at operation S410, Y, but it is determined that the knob (i.e., first manipulation part 210) is not in a turned off state at operation S420, N, it falls under a case where a user manipulation for the second manipulation part 230 is input while the knob (i.e., first manipulation part 210) is in a rotated state. Thus, according to an embodiment of the disclosure, the processor 250 maintains the turned-off state of the relay 251.

According to an embodiment of the disclosure, if a user manipulation for the second manipulation part 230 is not input at operation S410, N, and the knob (i.e., first manipulation part 210) is turned on at operation S480, Y, the processor 250 may warn the user by generating a notification or beep sound through the speaker (not shown) at operation S490. In this case, depending on various embodiments, the processor 250 may turn off the knob (i.e., first manipulation part 210), and display a guide message guiding to manipulate the second manipulation part 230 first on the display (not shown).

Figure 5:
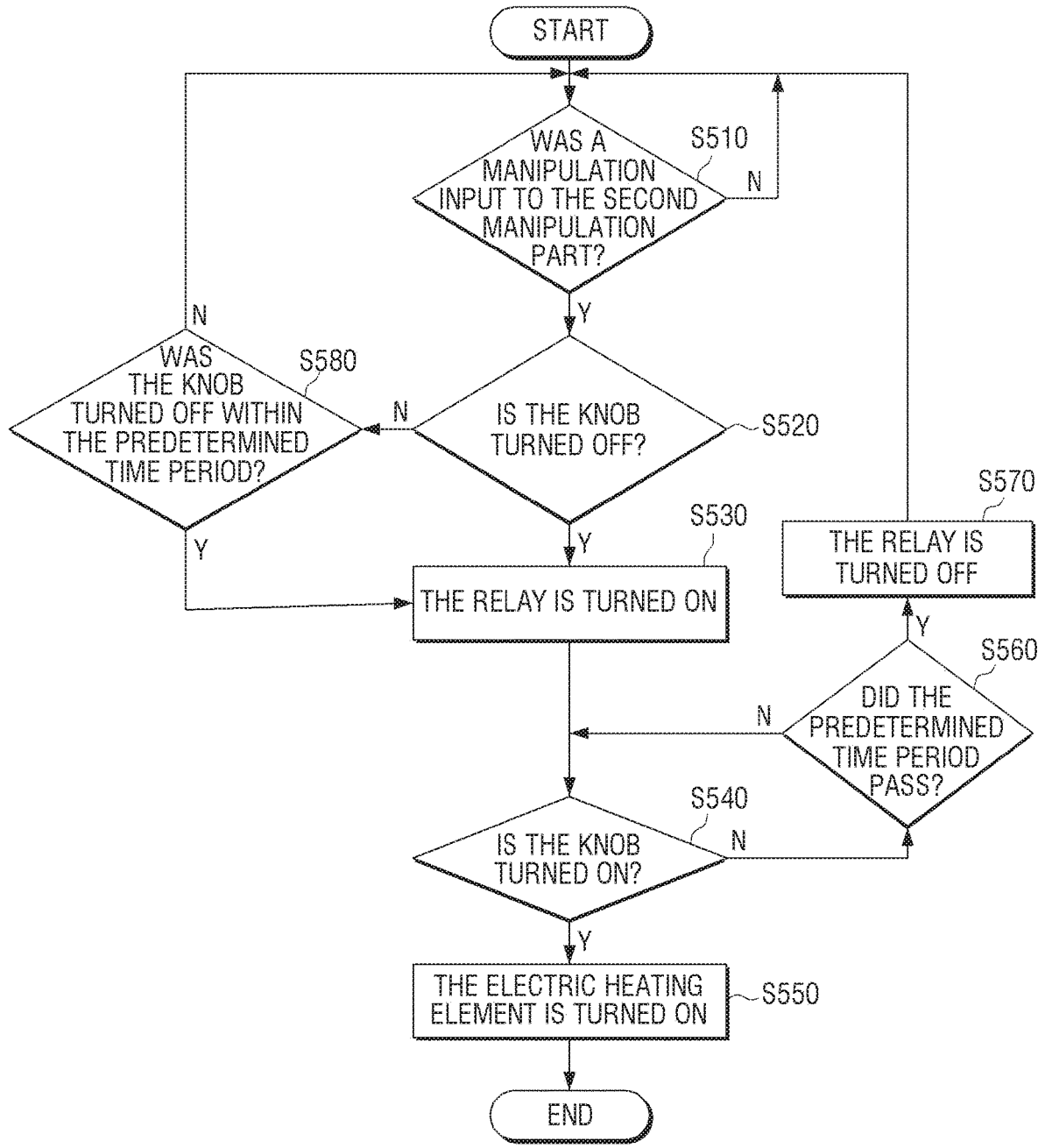
FIG. 5 is a flow chart illustrating an operation of a cooking apparatus according to an embodiment of the disclosure.

FIG. 5 is a flow chart illustrating an operation of a cooking apparatus according to an embodiment of the disclosure. FIG. 5 illustrates another embodiment related to a case where a user manipulation for the second manipulation part 230 is input while the knob (i.e., first manipulation part 210) is in a rotated state.

Referring to FIG. 5, in case a user manipulation for the second manipulation part 230 is input at operation S510, Y, but it is determined that the knob (i.e., first manipulation part 210) is not in a turned off state at operation S520, N, the processor 250 may determine whether the knob (i.e., first manipulation part 210) gets in a turned off state within a predetermined time period after a user manipulation for the second manipulation part 230 is input at operation S580. Accordingly, if the knob (i.e., first manipulation part 210) gets in a turned off state within a predetermined time period at operation S580, Y, the processor 250 may turn on the relay at operation S530. Accordingly, if the knob is turned on at operation S540, Y, the electric heating element 550 is turned on at operation S550.

Referring to FIG. 4, in case a user manipulation for the second manipulation part 230 is input while the knob (i.e., first manipulation part 210) is in a rotated state, the turned off state of the relay is maintained without consideration of whether the knob (i.e., first manipulation part 210) gets in a turned off state within a predetermined time period, and thus there is a difference from the example in FIG. 5 in this regard.

That is, in the case of FIG. 5, in consideration of the intention of a user manipulation for the second manipulation part 230, even if a user does not manipulate the second manipulation part 230 again, if the knob (i.e., first manipulation part 210) is turned off and turned on again within a predetermined time period after the initial manipulation of the second manipulation part 230, the user manipulation is processed as being effective, and thus there is a difference from the example in FIG. 4 in this regard.

The remaining operations S510 to S570 are similar to the operations S410 to S470 in FIG. 4, and thus overlapping explanation will be omitted.

Figure 6:
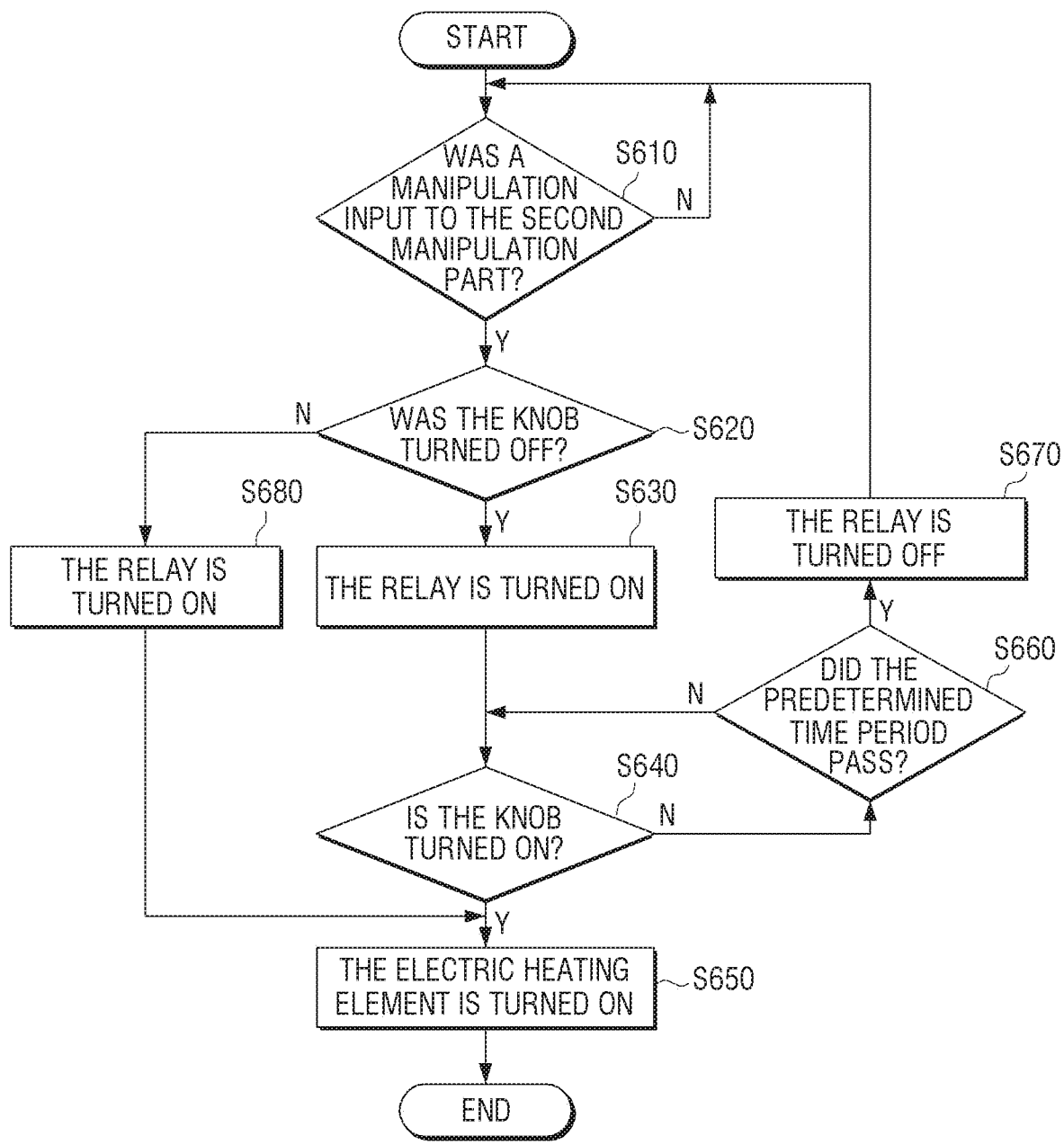
FIG. 6 is a flow chart illustrating an operation of a cooking apparatus according to an embodiment of the disclosure.

FIG. 6 is a flow chart illustrating an operation of a cooking apparatus according to an embodiment of the disclosure. FIG. 6 illustrates still another embodiment related to a case where a user manipulation for the second manipulation part 230 is input while the knob (i.e., first manipulation part 210) is in a rotated state.

Referring to FIG. 6, in case a user manipulation for the second manipulation part 230 is input at operation S610, Y, but it is determined that the knob (i.e., first manipulation part 210) is not in a turned off state at operation S620, N, the processor 250 may turn on the relay 251 as it is at operation S680, and thereby make the electric heating element 550 turned on at operation S650.

This embodiment is an embodiment for processing a user manipulation as being effective even if a user manipulation for the second manipulation part 230 is input while the knob (i.e., first manipulation part 210) was turned on previously, and in the aforementioned embodiments described in FIGS. 4 and 5, the relay is turned on based on the premise that the knob (i.e., first manipulation part 210) is in a turned off state, and thus there is a difference from the example in FIG. 6 in this regard.

Even if an operation is performed as in FIG. 6, for operating the electric heating element 240, a manipulation for the second manipulation part 230 is further needed in addition to the two-step manipulation (push and turn of the knob switch) of the conventional technology, and thus the above embodiment is meaningful.

The remaining operations S610 to S670 are similar to the operations S410 to S470 in FIG. 4, and thus overlapping explanation will be omitted.

Figure 7:
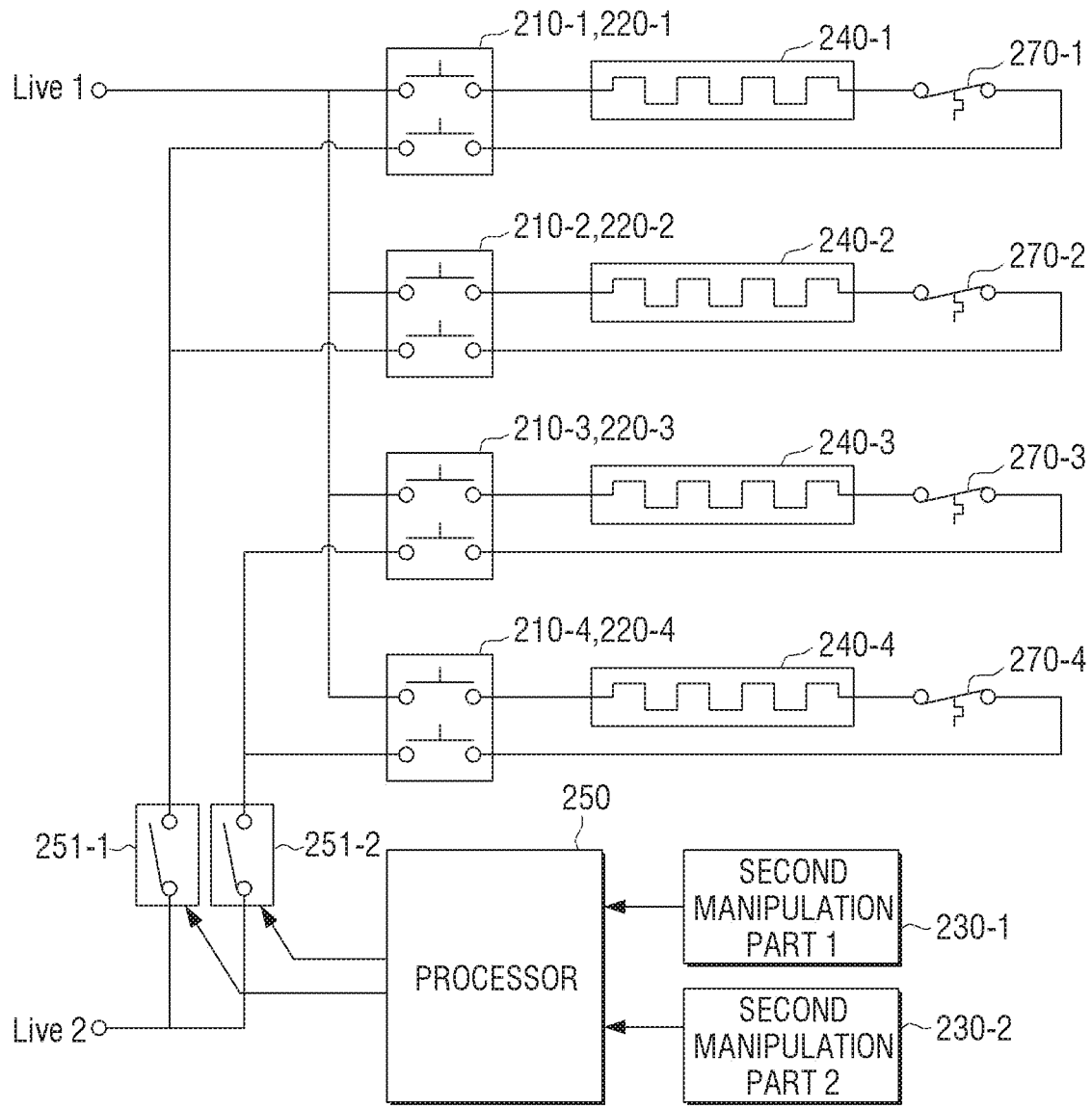
FIG. 7 is a block diagram of a cooking apparatus according to an embodiment of the disclosure.

FIG. 7 is a block diagram of a cooking apparatus according to an embodiment of the disclosure. FIG. 7 may be a block diagram corresponding to a cook top having four burners.

Referring to FIG. 7, a cooking apparatus 200' may include four electric heating elements 240-1 to 240-4 corresponding to four burners, and each of the electric heating elements 240-1 to 240-4 may include a knob switch 210-1/220-1 to 210-4/220-4 for controlling the turning-on/turning-off and the temperature setting of each of the electric heating elements.

In FIG. 7, a circuit controlling the four electric heating elements 240-1 to 240-4 through two relays 251-1, 251-2 is described as an example. Specifically, the electric heating elements 240-1, 240-2 are connected with the relay 251-1, and the electric heating elements 240-3, 240-4 are connected with the relay 251-2. Accordingly, a user may manipulate the second manipulation part 1 230-1 and then manipulate at least one of the two knob switches 210-1/220-1 and 210-2/220-2, and use at least one of the two electric heating elements 240-1, 240-2.

Also, a user can obviously manipulate the second manipulation part 2 230-2 and then manipulate at least one of the two knob switches 210-3/220-3 and 210-4/220-4, and use at least one of the two electric heating elements 240-3, 240-4.

The reference numerals 270-1 to 270-4 refer to overheat protection devices for preventing overheating of each of the four electric heating elements 240-1 to 240-4, and they refer to, for example, elements that can operate over a specific temperature and block connection between both ends, no matter what their names are.

For example, in case the reference numerals 270-1 to 270-4 are thermal protectors, if both ends are connected at a normal temperature and then the temperature becomes higher than a specific temperature, the thermal protectors may block connection between both ends by being broken by itself, and thereby prevent overheating of the electric heating elements 240-1 to 240-4. The thermal protectors 270-1 to 270-4 may be of a fuse type which is not connected again when it operates and is broken once, or they may be of a bimetal type where both ends are connected again when the temperature becomes lower than a certain temperature.

Various embodiments of the disclosure are obviously not limited to what is illustrated in FIG. 7. For example, the operation of each of the four electric heating elements 240-1 to 240-4 may be controlled by using four relays, and the operations of the four electric heating elements 240-1 to 240-4 can also be obviously controlled by one relay.

Figure 8:
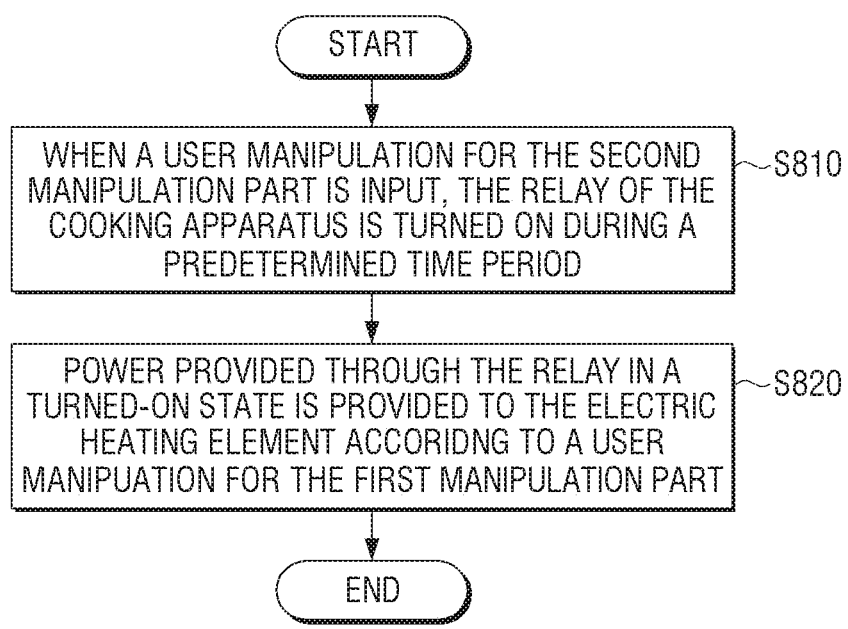
FIG. 8 is a flow chart illustrating a controlling method of a cooking apparatus according to an embodiment of the disclosure.

FIG. 8 is a flow chart illustrating a controlling method of a cooking apparatus according to an embodiment of the disclosure.

Referring to FIG. 8, a cooking apparatus according to an embodiment of the disclosure may include an electric heating element for heating an object to be cooked.

First, when a user manipulation for the second manipulation part is input, the relay of the cooking apparatus is turned on during a predetermined time period at operation S810.

Afterwards, power provided through the relay in a turned on state is provided to the electric heating element according to a user manipulation for the first manipulation part at operation S820.

The cooking apparatus includes a knob for controlling the turning-on/turning-off of the switch of the cooking apparatus by rotating according to a user manipulation for the first manipulation part, and at operation S820, power may be provided to the electric heating element through a switch that is turned on according to a user manipulation for the knob.

In this case, at operation S810, if a user manipulation for the second manipulation part is input, the manipulation state of the knob may be determined, and if it is determined that the knob is in a turned off state, the relay in a turned off state may be turned on for a predetermined time period, and when the predetermined time period passes, the relay may be turned off again.

In case a user manipulation for the knob is input while a user manipulation for the second manipulation part is not input, a warning sound may be output.

Also, if a user manipulation for the second manipulation part is input, the manipulation state of the knob may be determined, and if it is determined that the knob is in a rotated state, the turned off state of the relay may be maintained.

In this case, if the knob in a rotated state gets in a turned off state according to a user manipulation within a predetermined time period after a user manipulation for the second manipulation part is input while the knob is in a rotated state, the relay in the turned off state may be turned on.

When a user manipulation for the second manipulation part is input, the manipulation state of the knob may be determined, and if it is determined that the knob is in a rotated state, the relay in the turned off state may be turned on.

Also, if a user manipulation for the second manipulation part is input while the electric heating element operates, the operation of the electric heating element may be maintained regardless of the input user manipulation.

The cooking apparatus may further include a third manipulation part receiving input of a user manipulation for a child lock function. In this case, when a user manipulation for activating a child lock function is input through the third manipulation part, the child lock function may be activated, and if a user manipulation selecting the second manipulation part is input while the child lock function is activated, the relay may be turned on during a predetermined time period.

If the child lock function is activated, the door for opening and closing the cooking space of the cooking apparatus may be maintained in a locked state.

Figure 9:
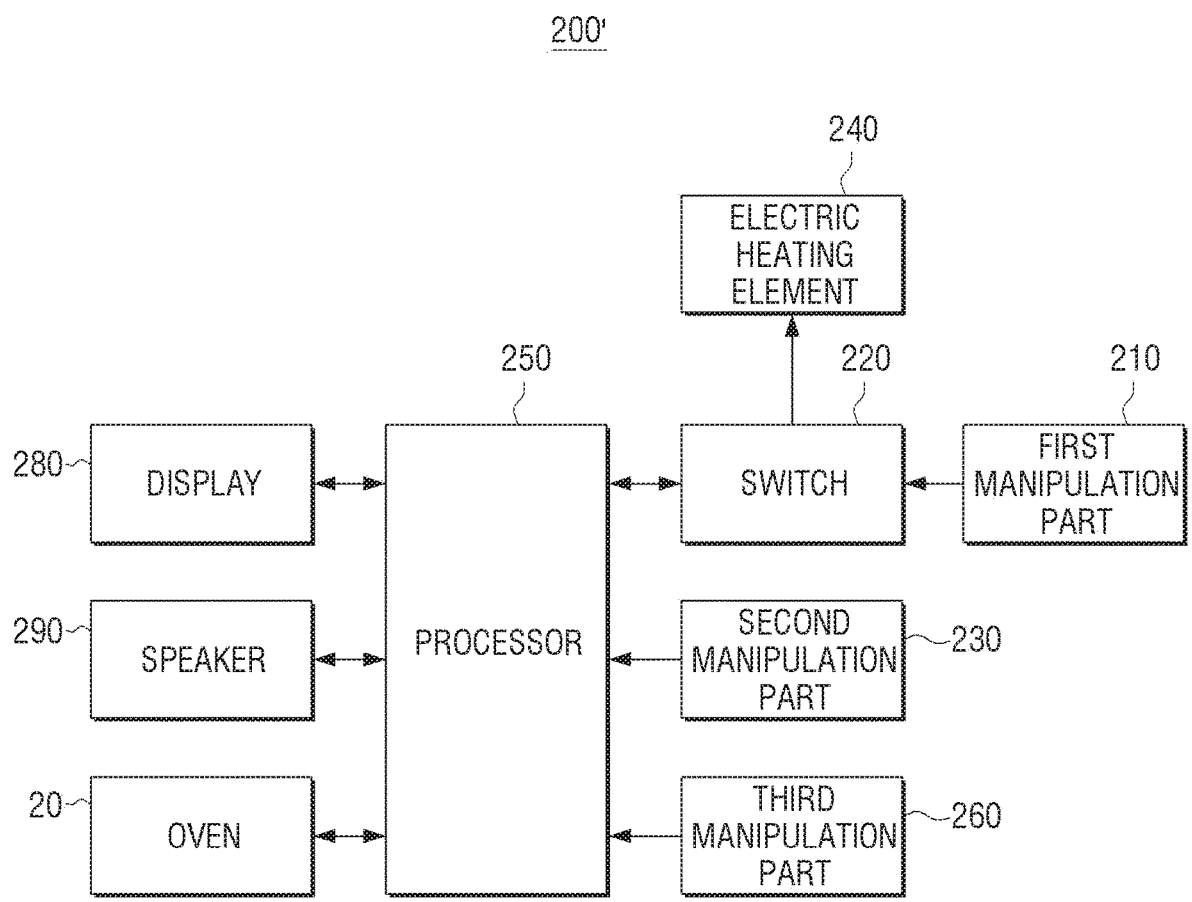
FIG. 9 is a detailed block diagram of a cooking apparatus according to an embodiment of the disclosure.

FIG. 9 is a detailed block diagram of a cooking apparatus according to an embodiment of the disclosure. In explaining FIG. 9, for contents that overlap with the aforementioned contents, explanation will be omitted.

Referring to FIG. 9, the cooking apparatus 200' may include a display 280, a speaker 290, an oven 20, and a third manipulation part 260, in addition to the components of the cooking apparatus 200 in FIG. 2. However, various embodiments of the disclosure are obviously not limited thereto.

The display 280 may display various texts or images under the control of the processor 250. For this, the display 280 may be implemented as displays in various forms such as a liquid crystal display (LCD), organic light emitting diodes (OLEDs), inorganic light emitting diodes (ILEDs), a plasma display panel (PDP), etc., and it may also be implemented as a touch screen including a touch panel.

Accordingly, the processor 250 may display various warning or guide messages through the display 280. For example, if a user manipulation for the first manipulation part 210 is input while a user manipulation for the second manipulation part 230 is not input, the processor 250 may control the display 280 to display a guide message guiding to perform a manipulation for the second manipulation part 230.

According to another embodiment of the disclosure, the display 280 may warn a user about an abnormal manipulation or guide to perform a manipulation for the second manipulation part 230 through a flickering display. In this case, the display 280 may be implemented as, for example, at least one light emitting diode (LED) lamp, and it may be arranged in a location where the second manipulation part 230 is arranged or near a location where the second manipulation part 230 is arranged on the cooking apparatus 200'. Accordingly, if a user manipulation for the first manipulation part 210 is input while a user manipulation for the second manipulation part 230 is not input, the processor 250 may make the display 280 flicker, and thereby warn a user about an abnormal manipulation or guide to perform a manipulation for the second manipulation part 230.

An embodiment where the aforementioned two types of displays 280 are provided together is obviously possible.

The speaker 290 may output various types of sounds. In particular, the speaker 290 may output various types of waning sounds or guide messages under the control of the processor 250. For example, if a user manipulation for the first manipulation part 210 is input while a user manipulation for the second manipulation part 230 is not input, the processor 250 may control the speaker 290 to output a voice guide message guiding to perform a manipulation for the second manipulation part 230 or a warning sound.

The third manipulation part 260 may receive input of a user manipulation for activating the child lock function of the oven 20. For this, the third manipulation part 260 may be provided in the form of a button or a touch panel. Accordingly, for example, if a user manipulation for activating the child lock function is input through the third manipulation part 260, the processor 250 may activate the child lock function by maintaining the door 22 for opening and closing the cooking space 21 of the oven 20 in a locked state.

As described above, even in a state where the child lock function is activated, and the oven 20 cannot be used, the function of the cook top 30 may be controlled independently from the child lock function of the oven 20, as described above.

FIGS. 10A, 10B, 10C, and 10D are diagrams illustrating an example where a cooking apparatus outputs a warning message or a guide message according to various embodiments of the disclosure. FIGS. 10A to 10D illustrate an example where the first manipulation parts (i.e., knobs 210-1 to 210-4), the second manipulation part 230, the display 280, 42 and the speaker 290 are implemented on the control panel 40 of the cooking apparatus 100', but the components may be arranged in numerous different places depending on implementation examples.

Referring to FIGS. 10A to 10D, for the cooking apparatus 100', an example where the cooking apparatus 100' includes four burners and a relay is illustrated. Accordingly, as illustrated in FIGS. 10A to 10D, it can be seen that the cooking apparatus 100' includes four knob switches 210-1 to 210-4 and a second manipulation part 230 in the form of a button for controlling each of the four burners (not shown).

As described above, for the normal operation of the cooking apparatus 100', a user needs to turn on the relay by pushing the second manipulation part 230 first, and then operate the knob switches 210-1 to 210-4.

However, if a user manipulation for the knob switches 210-1 to 210-4 is input while a user manipulation for the second manipulation part 230 is not input, the processor 250 may output a warning or guide message through the display 280 or the speaker 290.

Figure 10A:
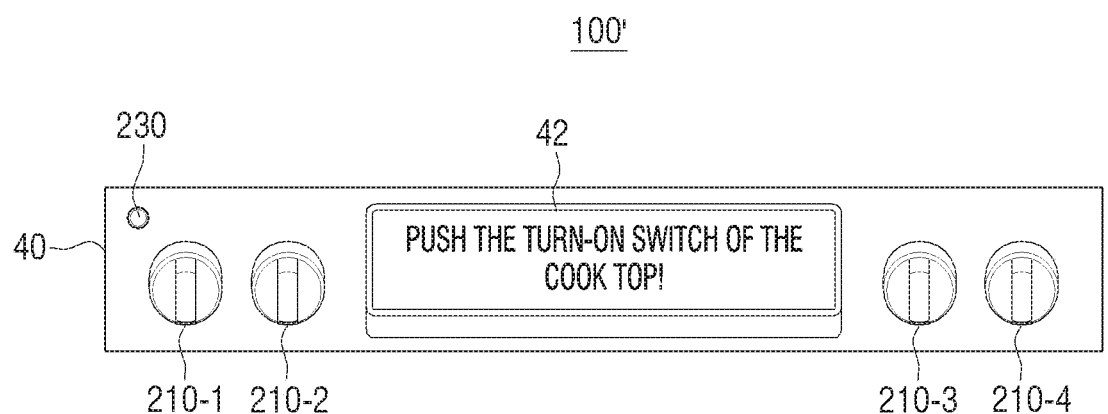
FIG. 10A is a diagram illustrating an example where a cooking apparatus outputs a warning message or a guide message according to an embodiment of the disclosure.

For example, if a user manipulation for the knob switches 210-1 to 210-4 is input while a user manipulation for the second manipulation part 230 is not input, the processor 250 may display a message such as "Push the turn-on switch of the cook top" on the display 280, 42, as illustrated in FIG. 10A, and thereby guide the user to perform a manipulation for the second manipulation part 230 first.

Figure 10B:
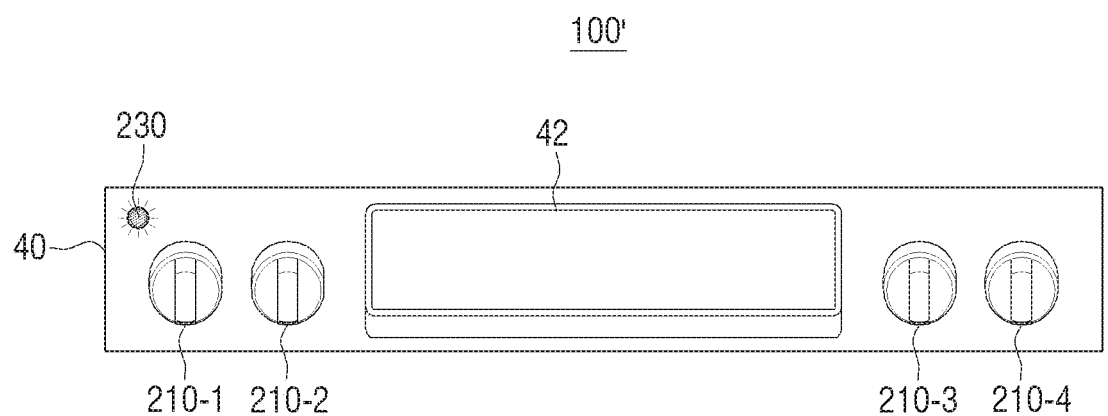
FIG. 10B is a diagram illustrating an example where a cooking apparatus outputs a warning message or a guide message according to an embodiment of the disclosure.

Also, depending on various embodiments, in case the display 280 (e.g., an LED lamp) is provided together in a location where the second manipulation part 230 is arranged, if a user manipulation for the knob switches 210-1 to 210-4 is input while a user manipulation for the second manipulation part 230 is not input, the processor 250 may warn the user about an abnormal manipulation or guide to perform a manipulation for the second manipulation part 230 by turning on or flickering the LED lamp, as illustrated in FIG. 10B.

Figure 10C:
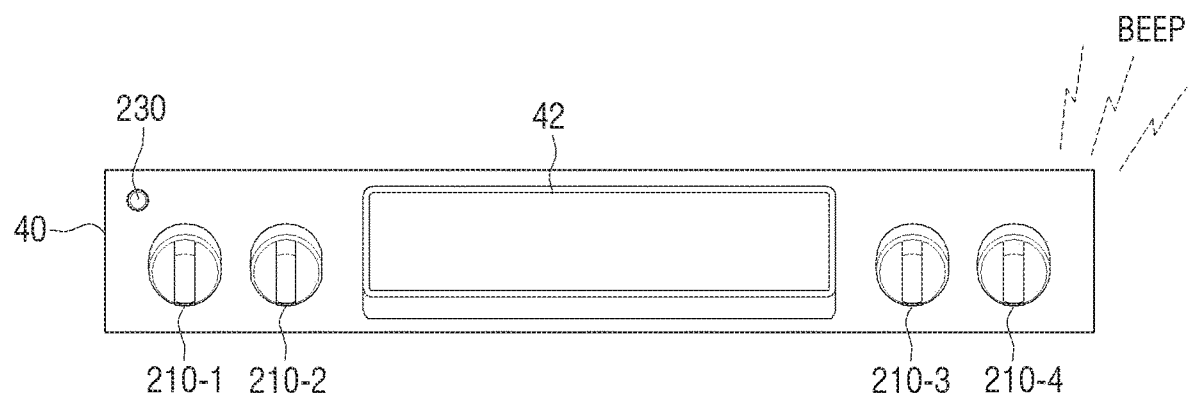
FIG. 10C is a diagram illustrating an example where a cooking apparatus outputs a warning message or a guide message according to an embodiment of the disclosure.
Figure 10D:
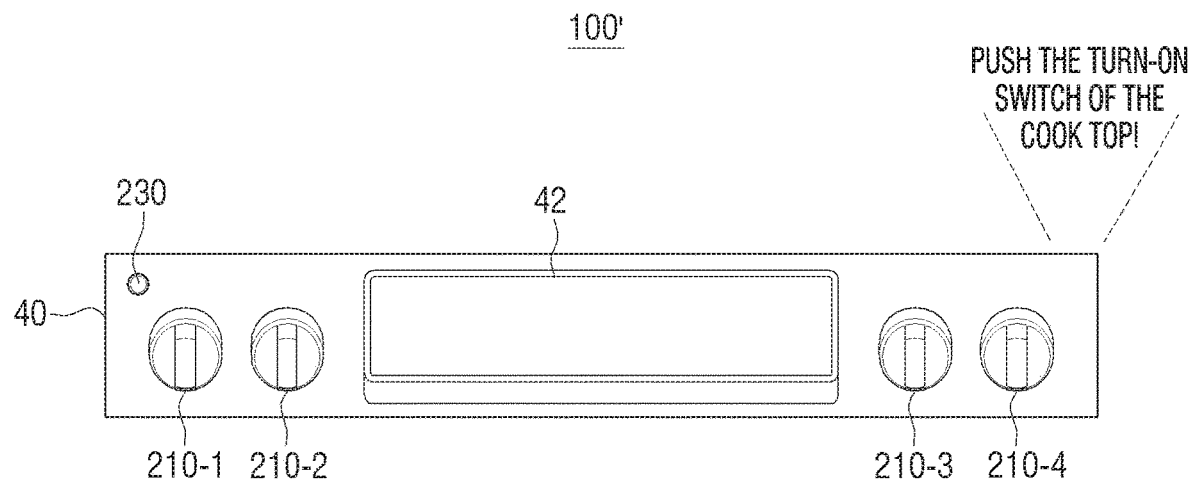
FIG. 10D is a diagram illustrating an example where a cooking apparatus outputs a warning message or a guide message according to an embodiment of the disclosure.

According to another embodiment of the disclosure, if a user manipulation for the knob switches 210-1 to 210-4 is input while a user manipulation for the second manipulation part 230 is not input, the processor 250 may output a beep sound as illustrated in FIG. 10C, or output a voice message such as "Push the turn-on switch of the cook top" as illustrated in FIG. 10D, and thereby warn the user about an abnormal manipulation or guide to perform a manipulation for the second manipulation part 230.

According to the various embodiments of the disclosure as described above, a user can be protected safely from an unintentional manipulation to a cooking apparatus. Also, even in a standby state where a child lock function is not activated, a problem according to an unintentional manipulation can be prevented.

The various embodiments of the disclosure may be implemented as software including instructions stored in machine-readable storage media, which can be read by machines (e.g., computers). The machines refer to apparatuses that call instructions stored in a storage medium, and can operate according to the called instructions, and the apparatuses may include the cooking apparatuses 100, 200 according to the aforementioned embodiments.

In case an instruction as described above is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. The term 'non-transitory' only means that a storage medium does not include signals, and is tangible, but does not indicate whether data is stored in the storage medium semi-permanently or temporarily.

According to an embodiment of the disclosure, the method according to the various embodiments described in the disclosure may be provided while being included in a computer program product. A computer program product refers to a product, and it can be traded between a seller and a buyer. A computer program product can be distributed on-line in the form of a storage medium that is readable by machines (e.g., a compact disc read only memory (CD-ROM)), or through an application store (e.g., play Store™). In the case of on-line distribution, at least a portion of a computer program product may be stored in a storage medium such as the server of the manufacturer, the server of the application store, and the memory of the relay server at least temporarily, or may be generated temporarily.

Further, each of the components according to the various embodiments of the disclosure (e.g., a module or a program) may consist of a singular object or a plurality of objects. Also, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A cooking apparatus comprising:
a first manipulation part;
a second manipulation part;
an electric heating element configured to heat an object to be cooked;
a first switch configured to be operated by the first manipulation part and positioned between a first live power line and the electric heating element;
a second switch configured to be operated by the first manipulation part and positioned between the electric heating element and a relay, the relay being configured to be in one of an on state or an off state, the second switch being configured to provide power from a second live power line through the relay in the on state to the electric heating element according to a user manipulation of the first manipulation part; and a processor configured to:
- based on receiving an input of a user manipulation of the second manipulation part, turn on the relay for a predetermined time period,
- based on receiving the input of the user manipulation for the second manipulation part, determine a manipulation state of the first manipulation part,
- based on determining that the first manipulation part is in a turned-off state, turn on the relay from a turned-off state for the predetermined time period, and
- based on not receiving input of the user manipulation of the first manipulation part in the predetermined time period, turn off the relay after the predetermined time period passes.

2. The cooking apparatus of claim 1,
- wherein the first manipulation part includes a knob configured to control the on state or the off state of the switch by rotation according to the user manipulation, and
- wherein the second switch is further configured to, based on being turned on according to the user manipulation of the knob, provide the power provided through the relay in the on state to the electric heating element.

3. The cooking apparatus of claim 2, further comprising:
a speaker,
- wherein the processor is further configured to, based on receiving an input of a user manipulation of the knob while the user manipulation of the second manipulation part is not input, control the speaker to output a warning sound or a voice message guiding a manipulation of the second manipulation part.

4. The cooking apparatus of claim 2, wherein the processor is further configured to:
- based on receiving an input of the user manipulation of the second manipulation part, determine a manipulation state of the knob, and
- based on determining that the knob is in a rotated state, maintain the turned-off state of the relay.

5. The cooking apparatus of claim 4, wherein the processor is further configured to, based on the user manipulation for the second manipulation part being input while the knob is in a rotated state and the knob in the rotated state is set to a turned-off state according to the user manipulation within the predetermined time period, turn on the relay from the turned-off state.

6. The cooking apparatus of claim 2, wherein the processor is further configured to:
- based on receiving the input of the user manipulation of the second manipulation part, determine a manipulation state of the knob, and
- based on determining that the knob is in a rotated state, turn on the relay from a turned-off state.

7. The cooking apparatus of claim 2, wherein the processor is further configured to:
- based on receiving the input of the user manipulation of the second manipulation part while the electric heating element operates, maintain an operation of the electric heating element regardless of the input of the user manipulation of the second manipulation part.

8. The cooking apparatus of claim 2, further comprising:
a third manipulation part receiving an input of a user manipulation of a child lock function, and
wherein the processor is further configured to:
- based on receiving the input of the user manipulation for activating the child lock function through the third manipulation part, activate the child lock function, and
- based on receiving the input of the user manipulation of the second manipulation part while the child lock function is activated, turn on the relay during the predetermined time period.

9. The cooking apparatus of claim 8, wherein the processor is further configured to, based on the child lock function being activated, maintain a door for opening and closing a cooking space of the cooking apparatus in a locked state.

10. A cooking device comprising:
- a plurality of electric heating elements configured to provide heat to an object;
- a first switch configured to provide power from a first power source and a second switch configured to provide power from a second power source to the at least one of the plurality of electric heating elements;
- a relay configured to, based upon actuation to provide power from the second power source to the second switch;
- at least one knob configured to, based on a rotation of the at least one knob when the first switch and the second switch are in an off state, control the first switch and the second switch to be set in an on state; and
- at least one processor configured to:
  - receive an input from a user interface to provide power to the at least one of the plurality of electric heating elements,
  - determine a current setting of the relay,
  - based on the relay being set in an off state, set the relay to an on state to provide power from the second power source to the switch,
  - based on receiving the input of a user manipulation for the user interface, determine a manipulation state of the knob,
  - based on determining that the knob is in a turned-off state, turn on the relay from a turned-off state for a predetermined time period, and
  - based on not receiving input of a user manipulation of the knob in the predetermined time period, turn off the relay after the predetermined time period passes.

* * * * *